United States Patent [19]

Ganesan

[11] Patent Number: 5,557,678
[45] Date of Patent: Sep. 17, 1996

[54] SYSTEM AND METHOD FOR CENTRALIZED SESSION KEY DISTRIBUTION, PRIVACY ENHANCED MESSAGING AND INFORMATION DISTRIBUTION USING A SPLIT PRIVATE KEY PUBLIC CRYPTOSYSTEM

[75] Inventor: Ravi Ganesan, Arlington, Va.

[73] Assignee: Bell Atlantic Network Services, Inc., Arlington, Va.

[21] Appl. No.: 277,376

[22] Filed: Jul. 18, 1994

[51] Int. Cl.$^6$ ............................. H04L 9/16; H04L 9/30
[52] U.S. Cl. ............................................. 380/21; 380/30
[58] Field of Search ............................ 380/21, 30

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,860,353 | 8/1989 | Brown ............................. 380/44 |
| 4,888,800 | 12/1989 | Marshall et al. ................ 380/21 |
| 4,926,478 | 5/1990 | Gruenberg . |
| 4,965,827 | 10/1990 | McDonald . |
| 4,995,082 | 2/1991 | Schnorr . |
| 5,029,208 | 7/1991 | Tanaka ............................ 380/21 |
| 5,052,040 | 9/1991 | Preston et al. . |
| 5,150,411 | 9/1992 | Maurer ............................ 380/30 |
| 5,208,853 | 5/1993 | Armbruster et al. . |
| 5,241,594 | 8/1993 | Kung . |
| 5,241,597 | 8/1993 | Bright . |
| 5,241,598 | 8/1993 | Raith . |
| 5,251,258 | 10/1993 | Tanaka . |
| 5,253,294 | 10/1993 | Maurer . |
| 5,299,263 | 3/1994 | Beller et al. . |
| 5,376,169 | 12/1994 | Seheidt et al. ................ 380/21 |

OTHER PUBLICATIONS

Bruce Schneier, "Applied Cryptopgraphy", Wiley & Sons, 1994 Sections 3.4 and 16.3 and p. 576. *Multiple Key Public Key*.

Digital Multisignatures, C. Boyd, Proceedings of the Inst. of Math, and its Appl. on Cryptography and Coding, 15–17 Dec. 1986.

A Method for Obtaining Digital Signatures and Public Key Cryptosystems, R. L. Rivest et al., CACM, vol. 21, pp. 120–126, Feb. 1978.

*Primary Examiner*—Gilberto Barrón, Jr.
*Attorney, Agent, or Firm*—Lowe, Price, LeBlanc & Becker

[57] ABSTRACT

A encryption method and system using split key public encryption. A first and second user private encryption key and a corresponding first and second user public encryption key are generated. The first and second user private encryption keys are divided into a first and second private user key portion and a corresponding first and second central authority key portion. The first and second private user key portions are respectively disclosed to the first and second users. The central authority key portions and the user public encryption keys are maintained by a central authority (CA). The first user request a communications session with the second user through the CA. After receiving the request, the CA encrypts a session encryption key with (i) the central authority key portion and user public encryption key associated with a first user to form a first encrypted session key and (ii) the central authority key portion and user public encryption key associated with the second user to form a second encrypted session key. The first encrypted session key is provided to the first user and the second encrypted session key is provided to the second user. The first user applies the first user's private user key portion to decrypt the first encrypted session key and the second user applies the second user's private user key portion to decrypt the second encrypted session key. The first user and the second user apply the decrypted common session key to encrypt and decrypt messages exchanged during a communications session. The method and system also provide for authorized wiretapping, video and data distribution and private enhanced messaging (PEM).

25 Claims, 5 Drawing Sheets

SYSTEM AND METHOD FOR CENTRALIZED SESSION KEY DISTRIBUTION, PRIVACY ENHANCED MESSAGING AND INFORMATION DISTRIBUTION USING A SPLIT PRIVATE KEY PUBLIC CRYPTOSYSTEM

BACKGROUND OF INVENTION

1. Field of the Invention

This invention relates to split private key cryptosystem and more particularly to an improved system and method for session key distribution, privacy enhanced messaging and information distribution using a split private key cryptosystem.

2. Description of the Related Art

Cryptosystems have been developed for maintaining the privacy of information transmitted across a communications channel. Typically, a symmetric cryptosystem is used for this purpose. Symmetric cryptosystems, which utilize electronic keys, can be likened to a physical security system where a box has a single locking mechanism with a single key hole. One key holder uses his/her key to open the box, place a message in the box and relock the box. Only a second holder of the identical copy of the key can unlock the box and retrieve the message. The term symmetric reflects the fact that both users must have identical keys.

In more technical terms, a symmetric cryptosystem consist of an encryption function E, a decryption function D, and a shared secret-key, K. The key is a unique string of data bits to which the functions are applied. Two examples of encipherment/deencipherment functions are the National Bureau of Standards Data Encryption Standard (DES) and the more recent Fast Encipherment Algorithm (FEAL). To transmit a message, M, in privacy, the sender computes $M=E(C,K)$, where C is referred to as the ciphertext. Upon receipt of C, the recipient computes $M=D(C,K)$, to recover the message M. An eavesdropper who copies C, but does not know K, will find it practically impossible to recover M. Typically, all details of the enciphering and deciphering functions, E and D, are well known, and the security of the system depends solely on maintaining the secrecy of key, K. Conventional symmetric cryptosystems are fairly efficient and can be used for encryption at fairly high data rates, especially if appropriate hardware implementations are used.

Asymmetric cryptosystems, often referred to as public key cryptosystems, provide another means of encrypting information. Such systems differ from symmetric systems in that, in terms of physical analogue, the box has one lock with two non-identical keys associated with it. Either key can be used to unlock the box to retrieve a message which has been locked in the box by the other key.

In public key electronic cryptosystems, each entity, has a private key, d, which is known only to the entity, and a public key, e, which is publicly known. Once a message is encrypted with a user's public-key, it can only be decrypted using that user's private-key, and conversely, if a message is encrypted with a user's private-key, it can only be decrypted using that user's public-key. It will be understood by those familiar with the art that although the terms "encrypt" and "decrypt" and derivations thereof are used herein in describing the use of public and private keys in an asymmetric public key cryptosystem, the term "transform" is commonly used in the art interchangeably with the term "encrypt" and the term "invert" is commonly used in the art interchangeably with the term "decrypt". Accordingly, as used herein in describing the use of public and private keys, the term "transform" could be substituted for the term "encrypt" and the term "invert" could be substituted for the term "decrypt".

If sender x wishes to send a message to receiver y, then x, "looks-up" y's public key e, and computes $M=E(C,e_y)$ and sends it to y. User y can recover M using its private-key $d_y$, by computing $M=D(C,d_y)$. An adversary who makes a copy of C, but does not have $d_y$, cannot recover M. However, public-key cryptosystems are inefficient for large messages.

Public-key cryptosystems are quite useful for digital signatures. The signer, x, computes $S=E(M, d_x)$ and sends $[M,S]$ to y. User y "looks-up" x's public-key $e_x$, and then checks to see if $M=D(S,e_x)$. If it does, then y can be confident that x signed the message, since computing S, such that $M=D(S, e_x)$, requires knowledge of $d_x$, x's private key, which only x knows.

Public-key cryptography also provides a convenient way of performing session key exchange, after which the key that was exchanged can be used for encrypting messages during the course of a particular communications session and then destroyed, though this can vary depending on the application.

One public key cryptographic system is the Rivest, Shamir, Adleman (RSA) system, as described in Rivest, Shamir and Adleman, "A Method of Obtaining Digital Signatures and Public Key Cryptosystems", CACM, Vol 21, pp 120–126, February 1978. RSA is a public-key based cryptosystem that is believed to be very difficult to break. In the RSA system the pair $(e_i,N_i)$, is user i's public-key and $d_i$ is the user's private key. Here $N_i=pq$, where p and q are large primes. Here also $e_id_i=1\mod\phi(N_i)$, where $\phi(N_i)=(p-1)(q-1)$ which is the Euler Toitient function which returns the number of positive numbers less than $N_i$, that are relatively prime to $N_i$. A Carmichael function is sometimes used in lieu of a Euler Toitient function.

To encrypt a message being sent to user j, user i will compute $C=M^{(e_j)}\mod N_j$ and send C to user j. User j can then perform $M=C^{(d_j)}\mod N_j$ to recover M. User i could also send the message using his signature. The RSA based signature of user i on the message, M, is $M^{d_i}\mod N_i$. The recipient of the message, user j, can perform $M^{(d_i)}\mod N_i^{(e_i)}\mod N_i$, to verify the signature of i on M.

In a typical mode of operation, i sends j, $M^{(d_i)}\mod N_i$ along with M and a certificate $C=(i,e_i,N_i)(d_{CA})\mod N_{CA}$, where C is generated by a Certificate Authority (CA) which serves as a trusted off-line intermediary. User j can recover i's public key from C, by performing $C^{(e_{CA})}\mod N_{CA}$, as $e_{CA}$ and $N_{CA}$ are universally known. It should also be noted that in an RSA system the encryption and signatures can be combined.

Modifications to RSA systems have been proposed to enable multi-signatures to be implemented. Such an approach is described in Digital Multisignature, C. Boyd, Proceedings of the Inst. of Math, and its Appl. on Cryptography and Coding, Dec. 15–17, 1986. The proposed approach extends the RSA system by dividing or splitting the user private key d into two portions, say $d_i$ and $d_j$, where $d_i*d_j=d$.

Recently an improved system and method for split key public encryption has been disclosed using a split private key, see U.S. patent application Ser. No. 08/277,808 filed on Jul. 20, 1994 for Y. Yacobi and R. Ganesan entitled "A System and Method for Identity Verificiation, Forming Joint Signatures and Session Key Agreement in an RSA Public Cryptosystem". The described system and method, allow two system users to verify each other's identity, form a joint signature and establish and distribute a session key in an RSA environment.

The system and method developed by Yacobi and Ganesan provides significant benefits where no intermediary between the users needs to be empowered with the ability to ease drop on encrypted communications. However, in practical systems, it is often desirable or required, for reasons other than security, that an intermediary with such power be placed between the users. Such an intermediary can provide a central point of audit and service cancellation, as well as other benefits. For example, public subscription systems, such as public electronic mail systems, will normally have a central intermediary empowered to monitor the access of a subscriber and terminate access should a subscriber fail to pay his monthly access fee. However, those conventional systems lack the capability to easily and promptly authorize a user's access to the system and distribute a session key or implement lawful wiretaps, privacy enhanced messaging and secure message distribution.

Therefore, it is an object of the invention to provide a system and method using split private key public encryption which facilitates confirmation of a user's authorized access to another user of the system by a central intermediary each time a communication is initiated.

It is a still further object of the present invention to provide a method and system using split private key public encryption to facilitate distribution of session keys through a central intermediary.

It is also an object of the invention to provide a method and system for session key distribution by a central intermediary using split private key encryption which facilitates the authorization and implementation of lawful wiretaps, privacy enhanced messaging and secure message distribution.

Additional objects, advantages and novel features of the present invention will become apparent to those skilled in the art from the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields which are within the scope of the invention as disclosed and claimed herein and with respect to which the invention could be of significant utility.

SUMMARY OF THE INVENTION

The present invention provides an improved method and system using a split key public cryptosystem.

In accordance with one aspect of the invention, a first and second user private encryption key and a corresponding first and second user public encryption key for a respective first and second user of a split key public cryptosystem are generated. The private encryption keys are divided into first and second user key portions and corresponding first and second central authority key portions. The first and second user key portions are respectively disclosed to the first and second users. The central authority key portions and public encryption keys are disclosed to a central authority.

After receiving a request from either of the users to establish a communications session with the other user, the central authority generates a session key. The key is encrypted separately with (i) the first central authority key portion and corresponding public encryption key to form a first encrypted session key and (ii) with the second central authority key portion and corresponding public encryption key to form a second encrypted session key. The first and second encrypted session keys are respectively disclosed to the first and second users. The first user decrypts the session key by applying the first user key portion to the first encrypted session key. The second user decrypts the session key by applying the second user key portion to the second encrypted session key. Messages exchanged between the first and second users during a communications session are encrypted/decrypted by applying the session key to the message.

According to another aspect of the invention, which could be useful for legal wiretaps, one or more of the users, for example the Federal Bureau of Investigation (FBI) and/or the Department of Justice, generate a first message(s), such as a request for a session key provided to two other users. The message is encrypted with both the Justice Department's and the FBI's user key portions. The central authority decrypts the message by applying the central authority key portions and the first and second public encryption keys to the message corresponding to the Justice Department's and FBI's user key portions. Assuming proper decryption verifies that the wiretap is properly authorized, the central authority generates a reply message. The reply message may, for example, include a session encryption key which has been previously provided by the central authority to the other system users. The reply message is encrypted with the central authority key portions and the public encryption key portions corresponding to the Justice Department's and the FBI's user key portions. The Justice Department and FBI decrypt the reply message by applying their respective user key portions to the encrypted reply message. Thus the FBI and/or Justice Department now have the session key being used by the other users to encrypt and decrypt their communications.

The central authority can also generate another user private encryption key and corresponding public encryption key, for example, for the switch which establishes and controls communication links between other users. This private encryption key is likewise divided into a user key portion and a corresponding central authority key portion. The user key portion is provided to the switch. The central authority key portion and the user public encryption keys are retained by the central authority.

The central authority can now generate a message directing the switch to establish the wiretap, perhaps by copying and/or transmitting to the FBI the communications for which the wiretap has been authorized. This message is encrypted with the central authority key and public encryption key corresponding to the switch's user key portion. The switch decrypts the message by applying its user key portion to the encrypted message. If the message is properly decrypted, the switch knows the message came from the central authority and, in response to the message, copies and/or transmits the communications to the F.B.I. and/or Justice Department. The F.B.I. and/or Justice Department can decrypt the intercepted communications using the session key which was previously provided by the central authority.

According to still another aspect of the invention which can be applied to privacy enhanced messaging (PEM), a first user generates a message which is subjected to a hash function to form a hash message. The hash message is encrypted with the first user key portion. The central authority further encrypts the encrypted hash message by applying the first central authority key portion to the encrypted hash message to form a fully encrypted hash message. A second user applies the first user's public key portion to decrypt the fully encrypted hash message.

In accordance with a still other aspect of the invention relating to message distribution, which is particularly suitable for video distribution, although not limited thereto, a video, is encrypted with a message encryption key to form an encrypted video. The message encryption key is preferably a symmetric encryption key. Upon receipt of a user request to view the video, the central authority generates a session key as described previously. The message encryption key is encrypted with the session key to form an encrypted message encryption key. The central authority further encrypts the encrypted video with the requesting user's central authority key portion and public encryption key to form a fully encrypted video. The requesting user applies the session key to decrypt the encrypted message encryption key. The requesting user can then apply the decrypted message encryption key and the his/her user key portion to decrypt the fully encrypted video.

The system according to the present invention includes means, preferably a central security processor, for generating a first and second user private encryption key and a corresponding first and second user public encryption key for respective first and second users of the system. The security processor or other suitable means divide each of the user private encryption keys into a user key portion and a corresponding central authority key portion. Modems, interfaces and other communication devices may also be provided for respectively conveying the first and second user key portions to the first and second users.

The central authority key portions and user public encryption keys are preferably stored on central storage device such as a central security server. The central security processor and server are preferably located in a secured area and linked with system users by a communications network such as a small local area network, wide area network or public telephone network, or any combination thereof.

A request of a first user to establish a communications session with second user is transmitted, by a suitable transmission device, to the central authority, who is represented on the system by the central security processor. The system could be implemented as part of an advanced intelligent network (AIN), in which case the request would be directed to the security processor by the AIN processor. Upon receiving the request, the central processor generates a session encryption key, which is typically a symmetric encryption key. The central processor then encrypts the session key separately with the first central authority key portion and corresponding user public encryption key to form a first encrypted session key and with the second central authority key portion and corresponding public encryption key to form a second encrypted session key. The private key portions and public keys are retrieved by the central processor from the central server prior to encrypting the session key.

The system has modems, interfaces and other means to respectively transmit the first and second encrypted session keys to the first and second users. These users are normally represented within the system by user stations. The first user's station receives the first encrypted session key and second user's station receives the second encrypted session key. Each user station preferably has a processor capable of decrypting the encrypted session key by applying the first or second user key portion, as applicable, to the received encrypted session key. The user station processors then apply the session key to encrypt and decrypt messages, which may be in the form of analog or digital voice, audio, video or data signals, transmitted, via the communications network, between the first and said second users.

In another embodiment, the system also includes one or more user stations or other means for encrypting a message with the first and second user key portions. The encrypted message is transmitted via the communications network to the central security processor. After receiving the encrypted message the central processor decrypts the message by retrieving from storage and applying the first and second central authority key portions and corresponding public encryption keys to the message. The processor then generates another message encrypted with the first and second central authority key portions and the corresponding public encryption key portions. This other encrypted message is transmitted via the communications network and received, for example, by a user station and decrypted by the station processor by applying the first and second user key portions to the encrypted message. If, for example the system is being used for a legal wiretap, the later encrypted message could be a session key for encrypting and decrypting messages exchanged during a communications session between users of the system other than the first and second users.

A typical system will also include at least one switch or other similar central device for establishing communications links between system users who desire to have a communications session. In one system embodiment, the central security processor has the capability to generate a user private encryption key and a corresponding user public encryption key for the switch and divides the user private encryption key into a user key portion and a corresponding central authority key portion. The user key portion may be stored on a switch processor, if desired. The central authority key portion and corresponding user public encryption key are preferably stored on the central security server.

Should, for example, a legal wiretap be authorized, the central security processor, in another embodiment, is capable of generating a message, and encrypting it with the central authority key and third user public encryption key corresponding to the switch's user key portion. The message could, for example, direct the switch to establish the tap. The encrypted message can be transmitted via the communications network, and received by the switch processor. The switch processor decrypts the encrypted message by application of the switch's user key portion. In accordance with the decrypted message the switch is reconfigured to copy or transmit encrypted messages between certain system users to the station or stations of the users who had obtained the wiretap authorization.

In another embodiment, the system incorporates means, preferably implemented within the user stations, for generating a hash message by applying a hash function to a message which will be communicated over the system. The user station encrypts the hash message with, for example, the user key portion of a first user. The encrypted hash message is transmitted, via the communications network, and received by the central security processor. The central security processor further encrypts the encrypted hash message with the central authority key portion for the first user to form a fully encrypted hash message. The fully encrypted hash message is transmitted via the network to another user station. After receipt, the recipient user station decrypts the message by applying the first user's public encryption key to the fully encrypted hash message.

In yet another embodiment which is particularly suitable for data or video distribution, the system also includes means, which could be the central security processor or preferably a separate processing unit, for encrypting a message, e.g. a compressed audio/video signal representing a video film, with a message encryption key to form an encrypted video. The message encryption key is preferably only known to the video owner or distributor. The encrypted video is stored in, for example, the central security server or another system server. After receipt of a request from a system user to view the video, and authorization from the video distributor, a session key is provided to the requester and the distributor as described above.

The distributor, using a user station, encrypts the message encryption key with the session key to form an encrypted message encryption key and transmits the encrypted key to the requester's station via the system's communications network. The requester's station decrypts the message encryption key using the session key. The central security processor retrieves the encrypted video from the central server and transmits the encrypted video to the requester's station. The requester's station receives the encrypted video and decrypts it by applying the decrypted message encryption key to the encrypted video.

In accordance with still other aspects of the invention the user key portions each have a bit length which is smaller than the bit length of the corresponding central authority key portion. It is preferred that the bit length of each user key portion which must be memorized or stored in a battery powered device, such as a cellular phone or personal communications device, is between 56 and 72 bits. The user private encryption key may be comprised of a private exponent and a modulus N which is a product of a plurality of numbers within a set of large secret prime numbers. In such cases the user public encryption key is comprised of a public exponent and the modulus N. It is also preferred that the bit length of each user key portion be no larger than fifteen percent of the bit length of the corresponding modulus N but no less than 56 bits.

The present invention is described above such that the public encryption key is used for particular encryption or decryption functions and in combination with a particular portion of the corresponding private encryption key. However, it will be understood by those skilled in the art that the public encryption key could equivalently be used in the reciprocal functions (i.e. for decryption rather than encryption and visa versa) and with the other portion of the corresponding private encryption key from those described above.

PREFERRED EMBODIMENT OF THE INVENTION

The present invention provides a system and method for improving conventional cryptosystems using a joint signature protocol in which two (or more) parties must collaborate in order to compute the digital signature. No single party can compute such a signature independently.

Figure 1:
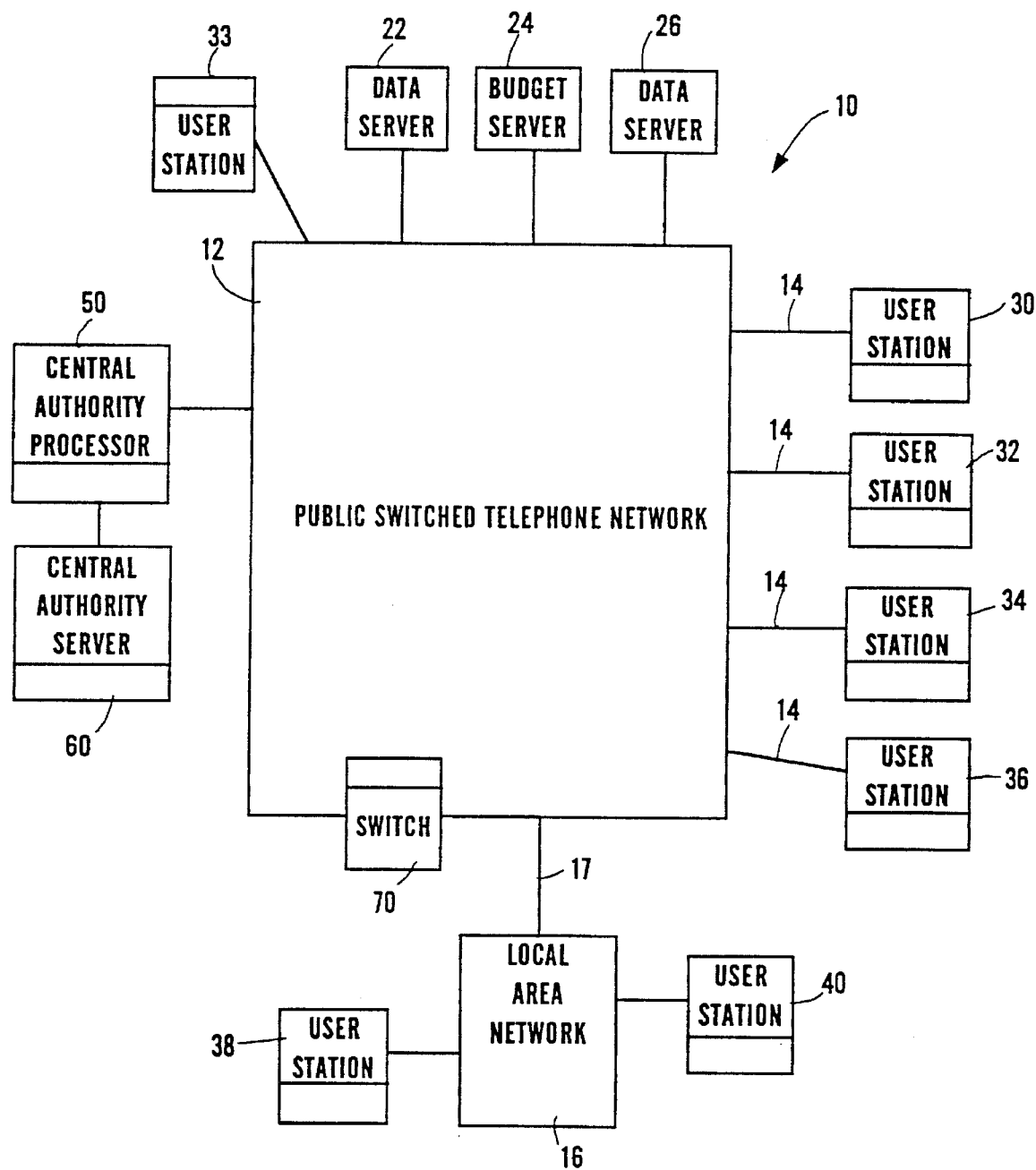
FIG. 1 illustrates a system in accordance with the present invention.

FIG. 1 schematically illustrates a distributed public cryptosystem 10 in accordance with the present invention. The distributed system 10 includes a communications network 12 which includes a switch 70 for establishing communication links between system users. A plurality of user stations, 30–40, are connected to a network 12. If, for instance, the network 12 is a public switched telephone network, the user stations 30–36 could be connected to network 12 via the subscriber lines 14. Another group of user stations, 38 and 40, are connected to the network 12 by the local area network (LAN) 16. The LAN 16 may, for example, be an Ethernet, token ring network or FDDI network. The LAN 16 is itself connected to the network 12, by a subscriber line 17. The user stations may be personal computers, work stations, telephones, personal communication devices, or any other device capable of inputting messages to and/or receiving messages from the network 12. The network 12 may be part of an advanced intelligent network (AIN). If the system is implemented in an AIN environment, communications beneficially are directed by one or more AIN processing units.

The distributed system 10 also includes a plurality of servers, 22–26. The servers illustratively contain databases which users at the user stations may wish to access. A central security processor 50 and central security server 60 complete the system.

Figure 2:
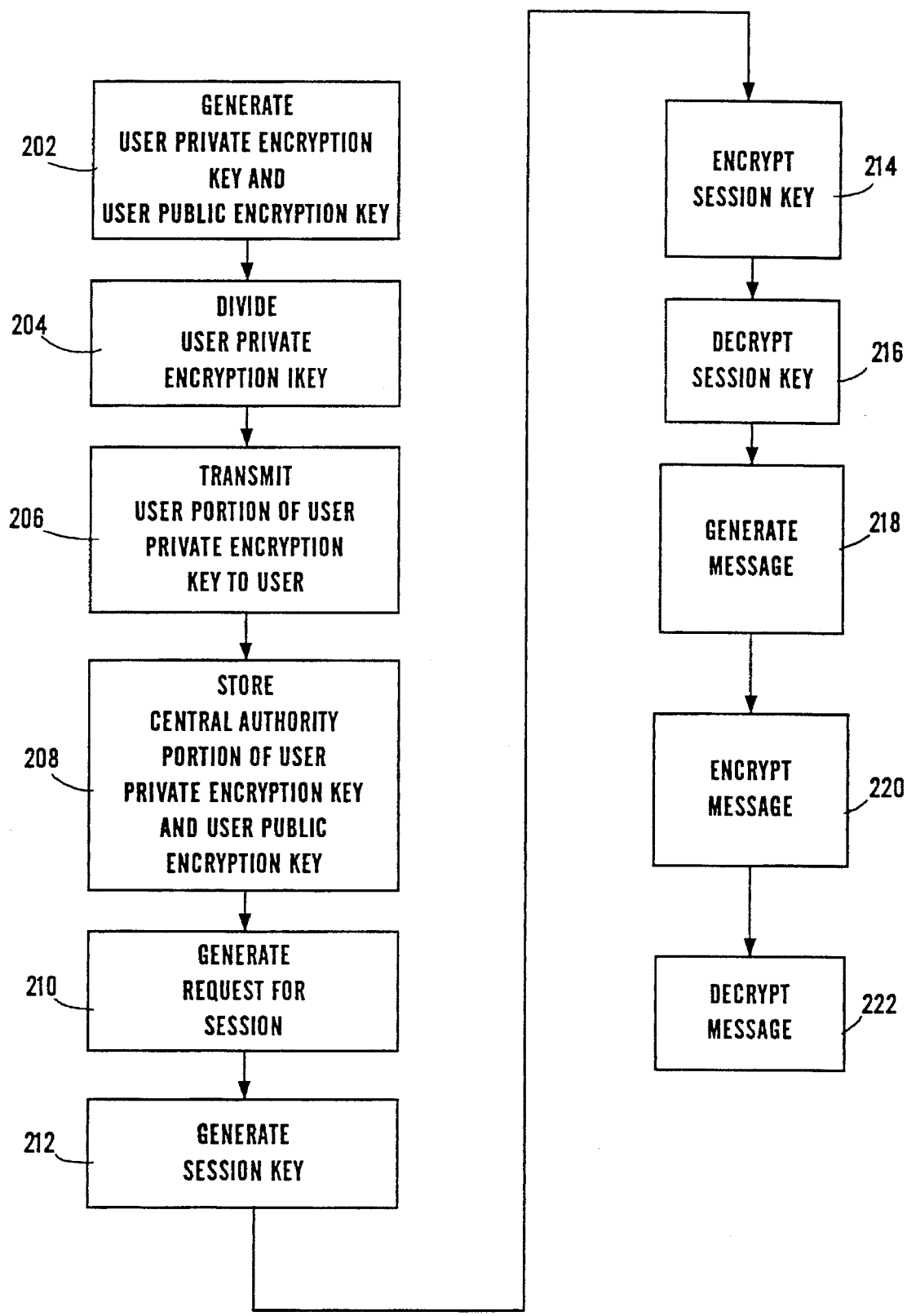
FIG. 2 illustrates session key distribution in accordance with the present invention.

Referring now to FIG. 2, in step 202 the private encryption keys and public encryption keys are generated by central security processor 50 for each user of the system. Processor 50 then divides the private encryption key into two portions in step 204. Alternatively, a user might select a private key portion for his/her own use. Processor 50 could then generate a second private key portion such that the user selected and processor generated private key portions can be joined to form the previously generated privated encryption key.

Both the private and public encryption keys are typically generated using a private exponent and a modulus N which is the product of a large number of prime numbers. It is preferable that the length of the portion of the divided private encryption key which is maintained by the user be substantially smaller than the modulus N value. It is further preferred that the user portion of the divided private encryption key be no larger than 15% of the length of the modulus N but not less than 56 bits. If the modulus N is 512 bits in length and, the user portion of the private encryption key must be memorized by the user or stored in the user's personal communications device or cellular phone, the user's portion of the divided private encryption key is preferably be between 56 and 72 bits.

After the private encryption keys have been divided, the user's portion can be transmitted by processor 50 via the public switch network, subscriber lines, LAN, and other communications links to the users in step 206. Alternatively, if more security is desired, the user private key portions could be provided to each user in some other manner in step 206. The central authority's portion of the private encryption key and the public key for each user are stored on central security server 60 by processor 50 in step 208.

In step 210 a request is received from a user using user station 30 to establish a communication session with a user at user station 32. The request is transmitted via the network to processor 50. In response to the request, processor 50 generates a session key in step 212. If desired session keys can be pre-generated and stored on server 60; however it is generally preferable to generate session keys when required. In step 214, processor 50 encrypts the session key with the central authority's portion of the private encryption key and associated public encryption key for the users at stations 30 and 32 thereby forming two encrypted session keys. The session key encrypted with the central uthority's portion of the private encryption key and associate public encryption key for the user at station 30 is transmitted to station 30. Correspondingly, the session key which has been encrypted by processor 50 with the central authority's portion of the station 32 user's private encryption key and associated public encryption is transmitted to station 32.

In step 216, the session key transmitted to station 30 is decrypted by the station 30 processor by applying that portion of the private encryption key which is maintained by the station 30 user. Similarly, station 32, using the portion of the private encryption key maintained by the station 32 user, decrypts the session key transmitted to station 32 by processor 50. Now that a session key has been distributed, communications between stations 30 and 32 can be secured. Thus, in step 218 a message is generated on station 30. The message is encrypted in step 220 by the station 30 processor with the session key. The encrypted message is transmitted via the network to station 32 and decrypted by the station 32 processor using the session key received by station 32.

Figure 3:
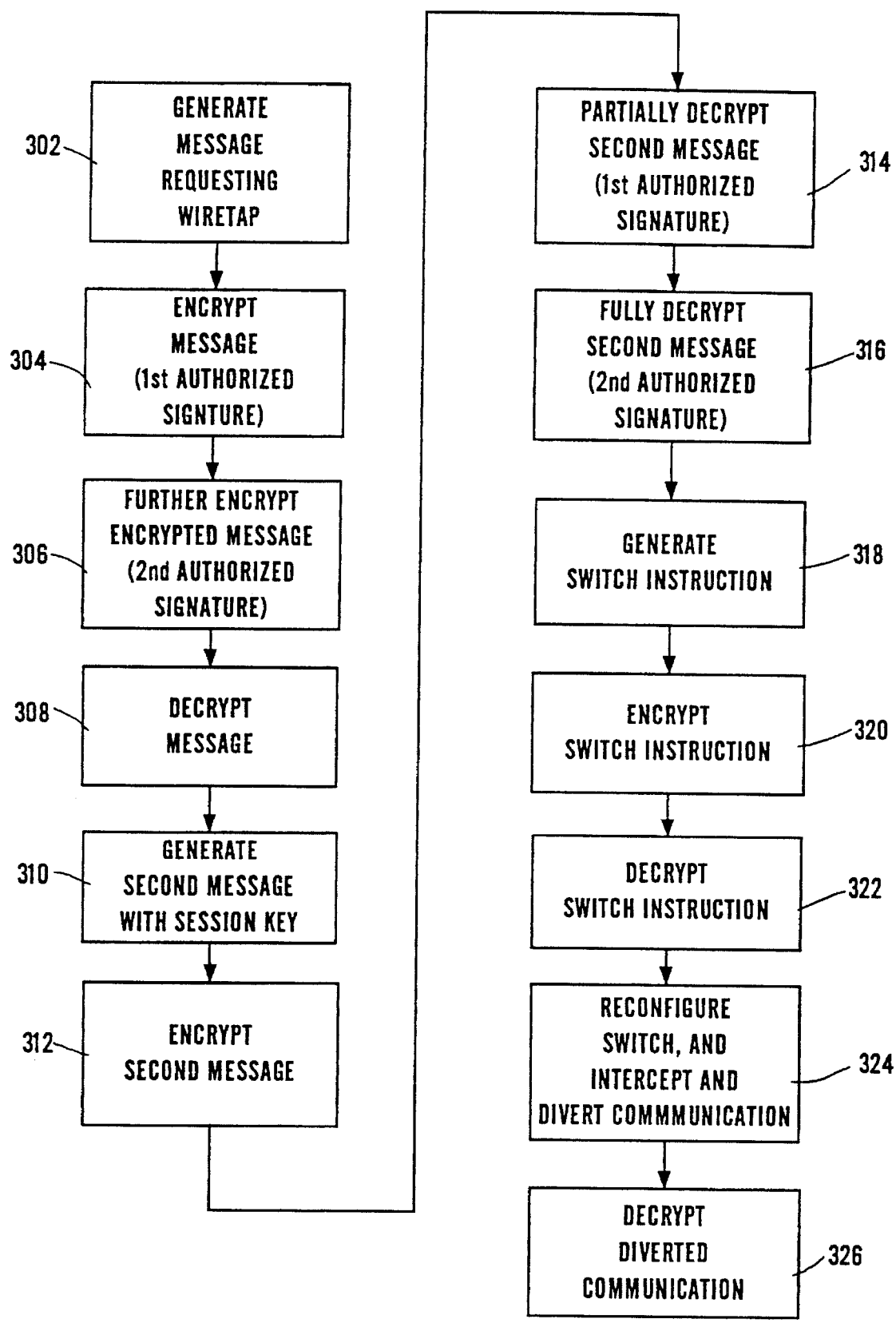
FIG. 3 illustrates wiretap authorization and implementation in accordance with the present invention.

FIG. 3 sets forth the preferred steps, should a wiretap be authorized, to intercept and eavesdrop on the communications between the users of stations 30 and 32. In step 302, a wiretap request is generated by a user on station 34. The message is encrypted in step 304 with the user's portion of his private encryption key on the station 34 processor and transmitted via the network to station 36 which is used by an individual required to authorize all wiretaps. If the user of station 36 is willing to authorize the wiretap, the message is further encrypted in step 306 by the station 36 user with his portion of his private encryption key. This jointly encrypted, or signed, message is transmitted by station 36 via the network to the central security processor 50. In step 308, the central security processor decrypts the message by applying the central authority's portion of state 34 and 36 user's private encryption keys and the associated public encryption keys to the message. The keys applied by processor 50 are retrieved as required from storage on central security server 60. Processor 50 knows that the wiretap has been properly authorized if the request for wiretap is properly decrypted by the application of the stored private encryption key portions and associated public encryption keys for the station 34 and 36 users, since these users must be known to processor 50 as having the joint authority to authorize wiretaps.

In step 310, station 50 generates a message containing the session key which has been provided to user stations 30 and 32. The session key is encrypted in step 312 with the central authority private encryption key portions and associated public encryption keys of the users of stations 34 and 36. The encrypted session key is then sent via the network to station 36 which applies its user's portion of the user's private encryption key to the message in step 314. This partially decrypted session key is transmitted via the network to station 34 which, in step 316, decrypts the message by applying its user's portion of the user's private encryption key.

In order to divert the communications between user stations 30 and 32 to station 34, processor 50 also generates a message to the switch 70 in step 318. The switch is treated as any other user of the system and thus a portion of the switch's private encryption key is maintained by the switch and the other portion of the switch's private encryption key and the associated public encryption key are stored on server 60. In step 320, processor 50 encrypts the message to the switch by applying the stored portion of the private encryption key and associated public encryption key for the switch. This encrypted message is transmitted via the network to the switch 70. Switch 70 decrypts the message by applying, in step 322, the portion of its private encryption key which it maintains and proceeds to configure the network in step 324 such that the communications between stations 30 and 32 are intercepted and diverted to station 34. Since the communications between station 30 and 32 have been encrypted with the session key which processor 50 has also provided to station 34, the intercepted communications can be decrypted by station 34 using the session key. Hence, in step 326 station 34 applies the session key to decrypt the intercepted messages. It should be noted that using the invention described herein, the authorized wiretap can be implemented without violating the secrecy of the user's portion of the private encryption key of those users whose communications are being intercepted.

Figure 4:
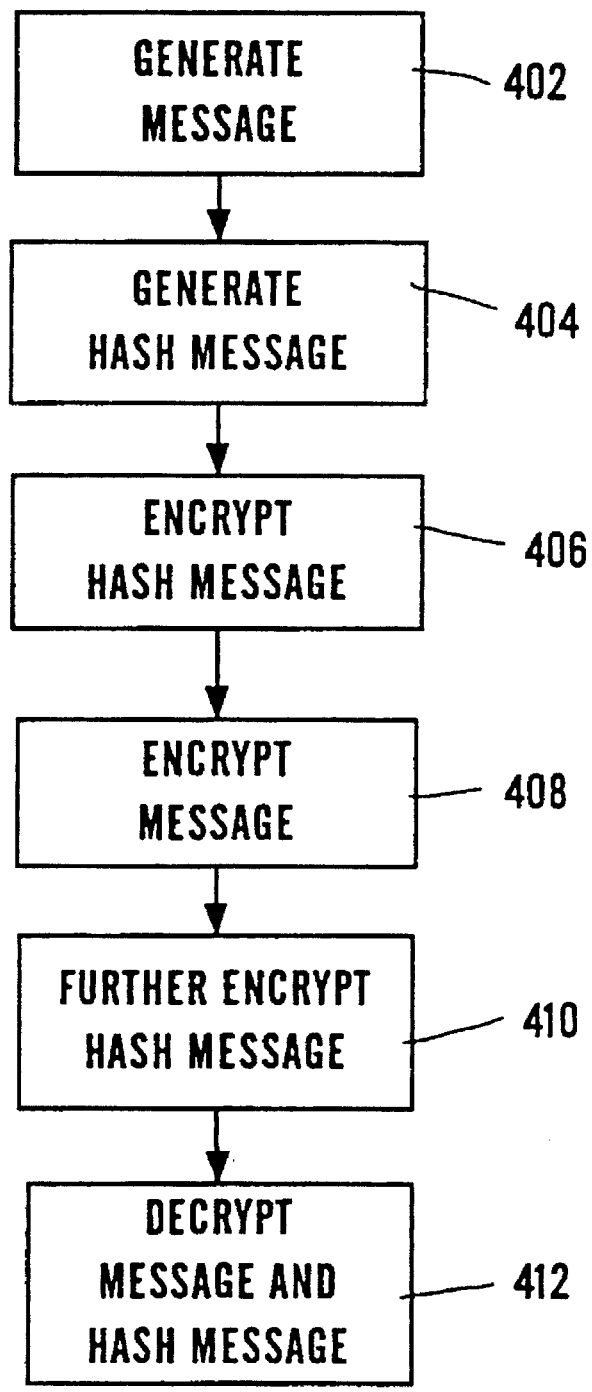
FIG. 4 illustrates privacy enhanced messaging (PEM) in accordance with the present invention.

FIG. 4 describes the steps implementing privacy enhanced messaging in accordance with the present invention. In step 402, a message is generated on station 30. Station 30 is, in accordance with this embodiment, provided with a hash function. In step 404 the station 30 processor applies the hash function to the generated message to generate a hash message. The hash message is encrypted in step 406 by station 30 using the user portion of the users private encryption key. In step 408 the message itself is encrypted by station 30 with the session key which had been distributed to stations 30 and 32 as described in connection with FIG. 2 above. The encrypted hash message and message are transmitted via the network to processor 50. In step 410, processor 50 further encrypts the hash message with the stored portion of the private encryption key for the user of station 30. This further encrypted hash message along with the encrypted message are transmitted by processor 50 via the network to station 32. To decrypt the messages, station 32 applies, in step 412, the public encryption key to the encrypted hash message and the session key to the encrypted message.

Figure 5:
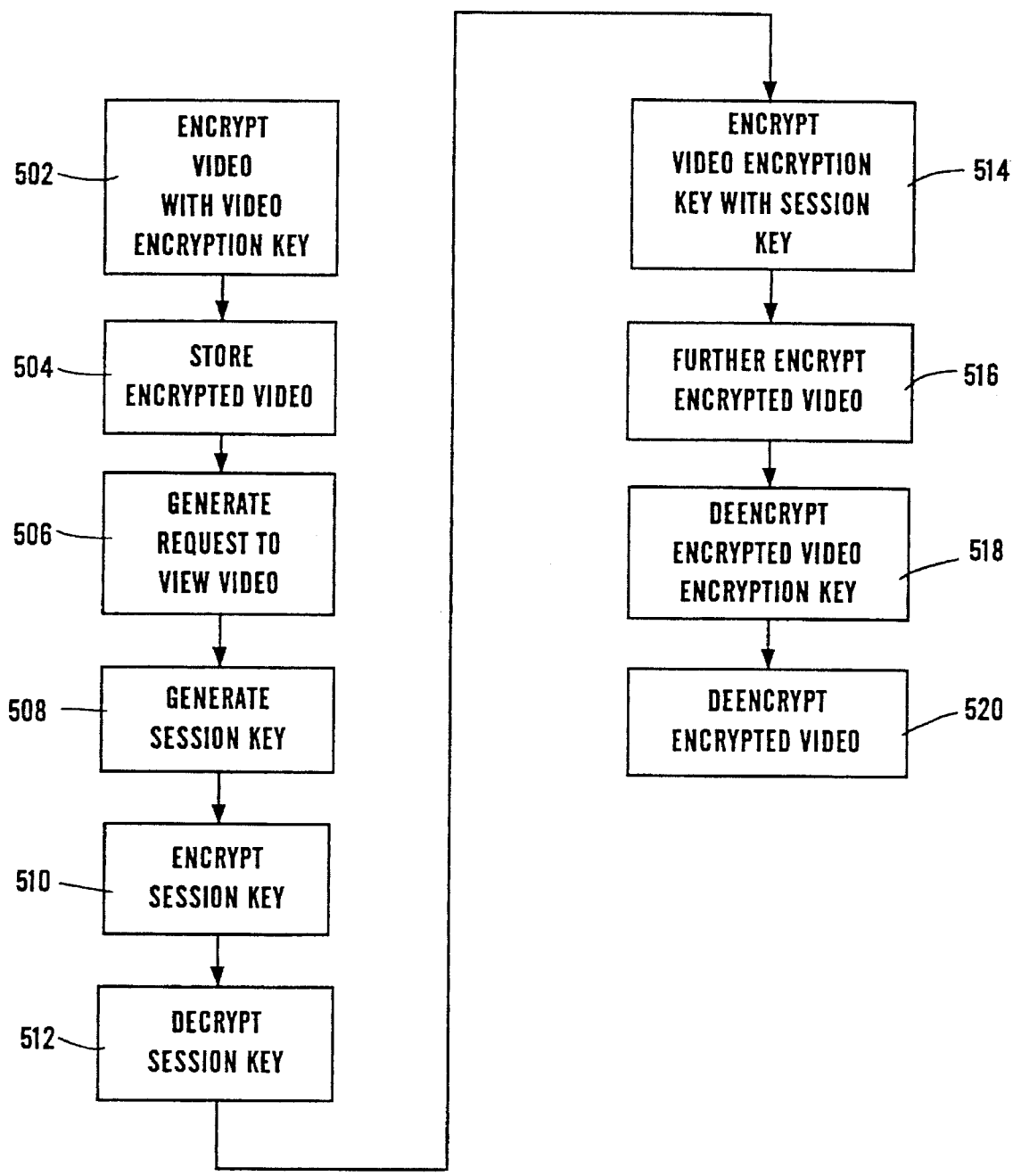
FIG. 5 illustrates video distribution in accordance with the present invention.

Turning now to FIG. 5, message distribution in accordance with the present invention will be described in the context of a video distribution system. In step 502 a video distributor acting through user station 33 encrypts a compressed video signal using a video encryption key which is preferably maintained with appropriate security in station 33's memory. The encrypted video is transmitted via the network to processor 50. This could be accomplished using a session key established between processor 50 and station 33 if desired. Processor 50 stores the encrypted video on server 60 in step 504. A user of station 38 generates a request to view the video in step 506 and transmits the request to processor 50 via network 12. Pursuant to the request, in step 508, station 50 generates a session key. The session key is encrypted in step 510 with the central authorities private encryption key portion and associated public encryption key for the users of stations 33 and 38 respectively. The appropriate encrypted session key is transmitted to station 33 and 38. In step 512, station 33 decrypts the session key by applying the video distributors retained portion of his private encryption key. Similarly, the session key is also decrypted by station 38 by applying the user portion of the private encryption key for the station 38 user to the encrypted session key received at that station. In step 514, station 33 encrypts the video encryption key with the session key and transmits the encrypted video encryption key to station 38 via the network. Processor 50 retrieves the encrypted video from storage on server 60 and in step 516 further encrypts the video with the central authorities private key portion and associated public encrypted key for the user of station 38. The encrypted video is next transmitted to station 38. In step 518, station 38 decrypts the video encryption key by applying the session key to the communication received from the video distributor station 33. Next in step 520, station 38 decrypts the video by applying the video encryption key and the user retained portion of the station 38 user's private encryption key to the encrypted video received from processor 50.

As described above, the present invention provides a system and method using split private key public encryption which furnishes automatic identity verification by a central intermediary prior to any information being exchanged. Additionally, the described system and method ensures that the users are authorized before a communications session is established. The system and method facilitate the distribution of session keys, and the proper authorization and implementation of wire taps. The described system and method are fully applicable to privacy enhanced messaging and are particularly suitable for the secure distribution of video, data and other messages.

I claim:

1. In a secured communication encryption system in which users are each associated with a public encryption key and a private encryption key, said private encryption key being divided between a central authority key portion maintained by a central authority and a private user key portion assigned to the user, a method for effecting secure communications during a communications session between users comprising the steps of:

generating a first user session encryption key by encrypting a session key with a combination of the public encryption key and the central authority key portion associated with a first user;

generating a second user session encryption key by encrypting a session key with a combination of the public encryption key and the central authority key portion associated with a second user;

decrypting said first user session encryption key by applying thereto the private user key portion of said first user to obtain a common session encryption key available to said first user;

decrypting said second user session encryption key by applying thereto the private user key portion of said second user to obtain said common session encryption key available to said second user; and using said common session encryption key for encrypting and decrypting a first message exchanged during the session.

2. A method according to claim 1, wherein each said key portion has a bit length and the bit length of the private user key portion is smaller than the bit length of the associated central authority key portion.

3. A method according to claim 2, wherein the bit length of each said private user key portion is between 56 and 72 bits.

4. A method according to claim 2, wherein (i) each said private encryption key is comprised of a private exponent and a modulus N which is a product of a plurality of numbers within a set of large prime numbers, (ii) each said public encryption key is comprised of a public exponent and the modulus N and (iii) the modulus N has a bit length and the bit length of each said private user key portion is no larger than fifteen percent of the bit length of the modulus N but no less than 56 bits.

5. A method according to claim 1, wherein said first message exchanged during said communications session is a video signal.

6. A method according to claim 1, wherein said first message exchanged during said communications session has a hash function applied thereto.

7. A method according to claim 1, further comprising the steps of:

generating a second message encrypted with a combination of the private user key portion of a third user and the private user key portion of a fourth user;

decrypting the second message by applying thereto a combination of the public encryption key and the central authority key portion associated with said third user and the public encryption key and the central authority key portion associated with said fourth user;

generating a third message encrypted with a combination of the public encryption key and the central authority key portion associated with said third user and the public encryption key and the central authority key portion associated with said fourth user; and decrypting said third message by applying thereto the private user key portion of said third user and the private user key portion of said fourth user to obtain said third message available to said third user;

8. A method according to claim 7, wherein said third message is the common session encryption key.

9. A method according to claim 8, further comprising the steps of:

generating a fourth message encrypted with a combination of the public encryption key and the central authority key portion associated with a fifth user;

decrypting said fourth message by applying thereto the private user key portion of said fifth user;

intercepting said first message in response to said fourth message; and decrypting said intercepted first message by applying thereto the common session encryption key available to said third user.

10. A method according to claim 1, further comprising the steps of:

generating a hash message formed by applying a hash function to the first message and encrypted with a combination of the private user key portion of the first user and the central authority key portion associated with the first user; and decrypting said hash message by applying thereto the public encryption key associated with the first user to obtain a decrypted hashed common message.

11. A method according to claim 1, wherein the first message is a message encryption key and further comprising the steps of:

generating a second message encrypted with the message encryption key; and decrypting said second message by applying thereto said message encryption key.

12. A method according to claim 11, wherein said second message is a compressed video signal.

13. A secured communication encryption system in which users are each associated with a public encryption key and a private encryption key, said private encryption key being divided between a central authority key portion maintained by a central authority and a private user key portion assigned to the user, comprising:

means for storing said central authority key portions and said public encryption keys;

means for generating a first user session encryption key by encrypting a session key with a combination of the public encryption key and the central authority key portion associated with said first user;

means for generating a second user session encryption key by encrypting the session key with a combination of the public encryption key and the central authority key portion associated with said second user;

means for decrypting said first session encryption key by applying thereto the private user key portion of said first user to obtain a common session encryption key available to said first user;

means for decrypting said second session encryption key by applying thereto the private user key portion of said second user to obtain said common session encryption key available to said second user; and means for using said common session encryption key for encrypting and decrypting a first message exchange during a session between the first and second users.

14. A system according to claim 13, wherein each said key portion has a bit length and the bit length of each private user key portion is smaller than the bit length of the associated central authority key portion.

15. A system according to claim 14, wherein the bit length of each said private user key portion is between 56 and 72 bits.

16. A system according to claim 14, wherein (i) each said private encryption key is comprised of a private exponent and modulus N which is a product of a plurality of numbers within a set of large prime numbers, (ii) each said public encryption key is comprised of a public exponent and the modulus N and (iii) the modulus N has a bit length and the bit length of each said private user key portion is no larger than fifteen percent of the bit length of the modulus N but not less than 56 bits.

17. A system according to claim 13, wherein said means for storing said central authority key portions and said public encryption keys is a server within said system.

18. A system according to claim 13, wherein said first message is a video signal.

19. A system according to claim 13, further comprising:

means for generating a second message encrypted with said private user key portion of said third user and said private user key portion of said fourth user;

means for decrypting said second message by applying thereto a combination of said central authority key portion and said public encryption key associated with said third user and said central authority key portion and said public encryption key associated with said fourth user;

means for generating a third message encrypted with a combination of said central authority key portion and public encryption key associated with said third user and said central authority key portion and public encryption key associated with said fourth user; and means for decrypting said third message by applying thereto said private user key portion of said third user and said private user key portion of said fourth user to obtain the third message available to said third user.

20. A system according to claim 19, wherein said third message is the common session encryption key.

21. A system according to claim 20, further comprising:

switching means for establishing a communications session between users of the system;

means for generating a fourth message encrypted with a combination of said central authority key portion and said public encryption key associated with said switching means;

means for decrypting said fourth message by applying thereto said private user key portion of said switching means;

means for reconfiguring said switching means so as to divert said first message to the third user in response to said fourth message; and means for decrypting said diverted first message by applying thereto the common session encryption key available to said third user.

22. A system according to claim 13, further comprising:

means for generating a hash message formed by applying a hash function to said first message and encrypted with said private user key portion of said first user and said central authority key portion associated with said first user; and means for decrypting the hash message by applying thereto the public encryption key associated with said first user.

23. A system according to claim 13, wherein the first message is a message encryption key and further comprising:

means for generating a second message encrypted with the message encryption key to form an encrypted second message;

means for storing said encrypted second message; and means for decrypting said encrypted second message by applying thereto said message encryption key.

24. A system according to claim 23, wherein said second message is a compressed video signal.

25. A system according to claim 23, wherein said second message has a hash function applied to it.

* * * * *